United States Patent
Ikuta et al.

(10) Patent No.: US 7,759,004 B2
(45) Date of Patent: Jul. 20, 2010

(54) ELECTRODE FOR LITHIUM ION SECONDARY BATTERIES, LITHIUM ION SECONDARY BATTERY USING THE SAME, AND METHOD FOR MANUFACTURING THE BATTERY

(75) Inventors: Shigeo Ikuta, Kawanabe-gun (JP); Tsumoru Ohata, Kyoto (JP)

(73) Assignee: Panasonic Corporation, Osaka (JP)

( * ) Notice: Subject to any disclaimer, the term of this patent is extended or adjusted under 35 U.S.C. 154(b) by 970 days.

(21) Appl. No.: 10/557,005

(22) PCT Filed: Dec. 1, 2004

(86) PCT No.: PCT/JP2004/017868

§ 371 (c)(1),
(2), (4) Date: Nov. 16, 2005

(87) PCT Pub. No.: WO2005/057691

PCT Pub. Date: Jun. 23, 2005

(65) Prior Publication Data

US 2007/0072083 A1   Mar. 29, 2007

(30) Foreign Application Priority Data

Dec. 12, 2003   (JP) .............................. 2003-414484

(51) Int. Cl.
*H01M 2/16*   (2006.01)
*H01M 4/04*   (2006.01)

(52) U.S. Cl. ........................ 429/209; 429/129; 429/142; 429/246

(58) Field of Classification Search ................ 429/127, 429/129, 134, 142, 144, 209, 246; 29/623.5
See application file for complete search history.

(56) References Cited

U.S. PATENT DOCUMENTS

| | | | | |
|---|---|---|---|---|
| 5,948,464 A | * | 9/1999 | Delnick | ........................ 427/77 |
| 6,090,506 A | | 7/2000 | Inoue et al. | |
| 6,287,720 B1 | * | 9/2001 | Yamashita et al. | .......... 429/131 |

(Continued)

FOREIGN PATENT DOCUMENTS

EP   849819 A2 *   6/1998

(Continued)

OTHER PUBLICATIONS

Japanese Office Action, with English Translation, issued in corresponding Japanese Patent Application No. 2003-414484, mailed on Jan. 30, 2007.

(Continued)

*Primary Examiner*—Gregg Cantelmo
(74) *Attorney, Agent, or Firm*—McDermott Will & Emery LLP

(57) ABSTRACT

Disclosed is an electrode for lithium ion secondary batteries which includes an active material layer containing active material particles and a porous insulating layer formed on the surface of the active material layer. The porous insulating layer includes an inorganic filler and a resin binder, and the surface of the active material layer has a first region on which the porous insulating layer is formed, and a second region on which the porous insulating layer is not formed. By using such an electrode, a lithium ion secondary battery can have a high capacity, excellent characteristics and improved safety.

9 Claims, 3 Drawing Sheets

U.S. PATENT DOCUMENTS

2002/0146626 A1\* 10/2002 Komatsu et al. ............ 429/246
2003/0152828 A1\* 8/2003 Sun ........................... 429/142

FOREIGN PATENT DOCUMENTS

| EP | 0 982 790 A | 3/2000 |
| EP | 1 184 927 A | 3/2002 |
| JP | 6-36800 | 2/1994 |
| JP | 06-283205 | 10/1994 |
| JP | 07-201357 | 8/1995 |
| JP | 07-220759 | 8/1995 |
| JP | 8-50922 | 2/1996 |
| JP | 8-88022 | 4/1996 |
| JP | 08236093 A \* | 9/1996 |
| JP | 8-255610 | 10/1996 |
| JP | 09-190814 | 7/1997 |
| JP | 9-190814 | 7/1997 |
| JP | 11-102730 | 4/1999 |
| JP | 11-317218 | 11/1999 |
| JP | 2002-83590 | 3/2002 |
| JP | 2004-259625 | 9/2004 |
| WO | WO 03012896 A1 \* | 2/2003 |

OTHER PUBLICATIONS

Chinese Office Action, with English translation, issued in Chinese Patent Application No. CN 200480018703.1, mailed Jul. 6, 2007.
European Search Report issued in European Patent Application No. 04 82 0155 dated Jul. 29, 2009.

\* cited by examiner

ELECTRODE FOR LITHIUM ION SECONDARY BATTERIES, LITHIUM ION SECONDARY BATTERY USING THE SAME, AND METHOD FOR MANUFACTURING THE BATTERY

TECHNICAL FIELD

The present invention relates to a lithium ion secondary battery excellent in heat resistance and safety under internal short circuit conditions.

BACKGROUND ART

An electrochemical battery such as a lithium ion secondary battery is provided between the positive electrode and the negative electrode with a separator which electrically insulates these electrodes and holds electrolyte. Such separators, particularly those in lithium ion secondary batteries, are currently made of microporous film mainly made of polyethylene, polypropylene or the like.

However, in general, separators made of these materials shrink easily at high temperatures. If the battery shorts out internally or a sharp-pointed object such as a nail has penetrated through it, there is a sudden generation of reaction heat of the short circuit. As a result, the separator shrinks to increase the short circuit area so as to generate a larger amount of reaction heat. This repeated alternation between the separator shrinkage and the generation of the large amount of reaction heat causes an abnormal rise in the temperature inside the battery.

In order to increase the battery safety, it has been proposed to form a porous coating film containing solid microparticles onto the surface of an active material layer (See Patent Document 1).

[Patent Document 1] Japanese Patent No. 3371301

DISCLOSURE OF INVENTION

Problems to be Resolved by the Invention

In the conventional art mentioned above, ions pass through the pores of a porous coating film which is formed by applying a mixture of a resin binder and solid microparticles onto an electrode plate, thereby creating a battery function. Therefore, when the coating film is formed throughout the surface of the active material layer, the coating film reduces ion conduction even if it is a porous film, thereby increasing the internal resistance of the battery. This causes the battery to decrease in the charge-discharge characteristics or in the capacity.

Furthermore, the porous coating film is intended to reduce exfoliation of the active material, and cannot secure safety against internal short circuit or nail penetration.

In view of this, an object of the present invention is to provide an electrode for lithium ion secondary batteries having a high capacity, excellent performance and reduced internal short circuit so as to improve safety against nail penetration, and also to provide a lithium ion secondary battery using this electrode.

Means of Solving the Problem

The present invention relates to an electrode for lithium ion secondary batteries, which comprises an active material layer containing active material particles and a porous insulating layer formed on a surface of the active material layer. The porous insulating layer comprises an inorganic filler and a resin binder, and the surface of the active material layer has a first region on which the porous insulating layer is formed, and a second region on which the porous insulating layer is not formed.

In the electrode for lithium ion secondary batteries, it is preferable that the first regions be distributed throughout the surface of the active material layer and also account for 20 to 90% of the surface of the active material layer.

The present invention also relates to a lithium ion secondary battery comprising: a positive electrode including a positive electrode active material layer containing a positive electrode active material; a negative electrode including a negative electrode active material layer containing a negative electrode active material; a separator disposed between the positive electrode and the negative electrode; and an electrolyte containing a nonaqueous solvent. At least one of the positive electrode and the negative electrode has a porous insulating layer on the surface of the active material layer. The porous insulating layer comprises an inorganic oxide filler and a resin binder. The surface of the active material layer has a first region on which the porous insulating layer is formed, and a second region on which the porous insulating layer is not formed.

In the lithium ion secondary battery, it is preferable that the separator comprises microporous film, and the microporous film comprises polyolefin.

The present invention also relates to a method for manufacturing a lithium ion secondary battery comprising: a positive electrode including a positive electrode active material layer containing a positive electrode active material; a negative electrode including a negative electrode active material layer containing a negative electrode active material; a porous insulating layer provided on the surface of at least one of the positive electrode active material layer and the negative electrode active material layer; a separator disposed between the positive electrode and the negative electrode; and an electrolyte containing a nonaqueous solvent. This method comprises the steps of: mixing an inorganic filler, a resin binder and a solvent to form a slurry; and applying the slurry throughout the surface of the at least one of the positive electrode active material layer and the negative electrode active material layer in one of an island-like pattern and a predetermined pattern to form a first region having the slurry thereon and a second region not having the slurry thereon.

In the aforementioned manufacturing method, it is preferable that the slurry be applied by inkjet printing or gravure coating.

The present invention also relates to a method for manufacturing a lithium ion secondary battery comprising: a positive electrode including a positive electrode active material layer containing a positive electrode active material; a negative electrode including a negative electrode active material layer containing a negative electrode active material; a porous insulating layer provided on the surface of at least one of the positive electrode active material layer and the negative electrode active material layer; a separator disposed between the positive electrode and the negative electrode; and an electrolyte containing a nonaqueous solvent. The method comprises the steps of: mixing an inorganic filler, a resin binder, and a solvent to form a slurry; applying the slurry throughout the surface of the at least one of the positive electrode active material layer and the negative electrode active material layer; and leveling the slurry applied onto the surface to form a first region having the slurry thereon and a second region not having the slurry thereon.

The term "leveling" indicates, after applying a predetermined amount of slurry onto the positive or negative electrode having a rough surface, keeping the positive or negative electrode having the rough surface still in order to pour the slurry into the depressions on the surface, thereby exposing the protrusions on the surface. In this manner, the slurry is thinly coated onto the surface of the positive or negative electrode, and then the slurry is leveled so as to form the first region with the slurry and the second region without the slurry by making use of the asperities on the surface of the positive or negative electrode.

In the aforementioned manufacturing method, it is preferable that the slurry be applied by spray coating.

EFFECTS OF THE INVENTION

As described hereinbefore, the present invention can provide a lithium ion secondary battery which is safe under internal short circuit conditions or against nail penetration, and which is also excellent in capacity, charge-discharge characteristics and heat resistance.

BEST MODE FOR CARRYING OUT THE INVENTION

The present invention will be described as follows with reference to accompanying drawings.

Figure 1:
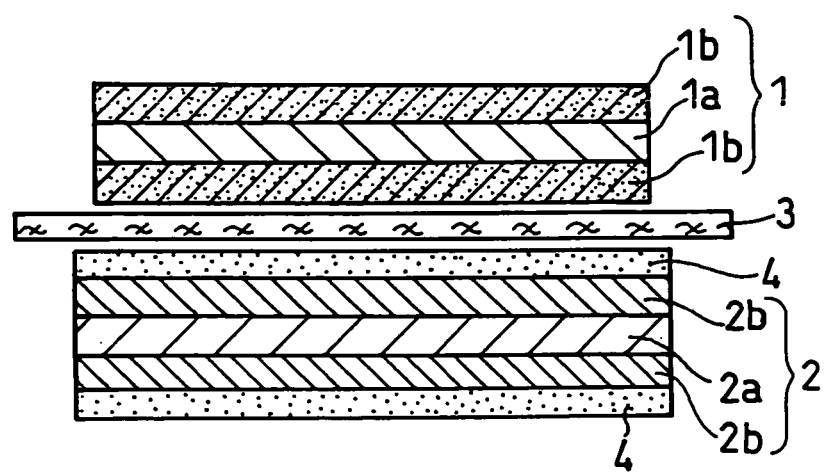
FIG. 1 is a schematic cross sectional view of the structure of an electrode assembly used in a lithium ion secondary battery according to an embodiment of the present invention.

FIG. 1 shows the schematic structure of an electrode assembly used in a lithium ion secondary battery according to an embodiment of the present invention.

Figure 2:
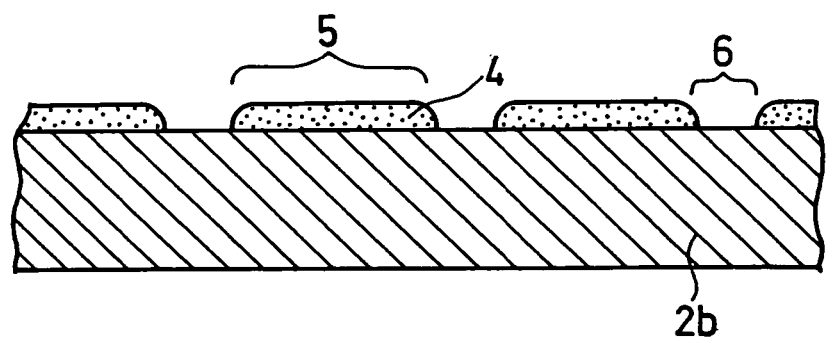
FIG. 2 is an enlarged view of a porous insulating layer in the electrode assembly shown in FIG. 1.

The electrode assembly shown FIG. 1 comprises a positive electrode 1, a negative electrode 2, and a separator 3 disposed between them. The positive electrode 1 comprises a positive electrode current collector 1a and positive electrode active material layers 1b carried on both sides of the positive electrode current collector 1a. The negative electrode 2 comprises a negative electrode current collector 2a and negative electrode active material layers 2b carried on both sides of the negative electrode current collector 2a. Each of the negative electrode active material layers 2b is provided on its surface with a porous insulating layer 4 comprising an inorganic filler and a resin binder. As shown in FIG. 2, which is an enlarged view of the vicinity of the surface of each of the negative electrode active material layers 2b, each of the negative electrode active material layers 2b is provided on its surface with first regions 5 on which the porous insulating layer 4 is formed, and second regions 6 on which the porous insulating layer 4 is not formed.

In the case of using an electrode assembly of laminated type which includes a single positive electrode and a single negative electrode, the porous insulating layer 4 may be formed on the surface of at least one of the positive electrode active material layer and the negative electrode active material layer that is opposed to the other active material layer.

It is preferable that the porous insulating layers be distributed throughout the surfaces of the active material layers.

Figure 3:
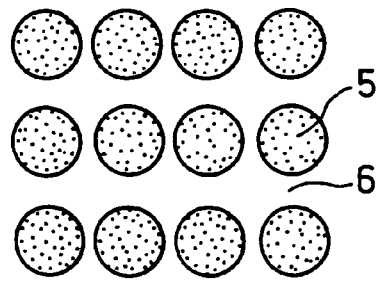
FIG. 3 is a schematic view of an island-like pattern used in the formation of the porous insulating layers.
Figure 4:
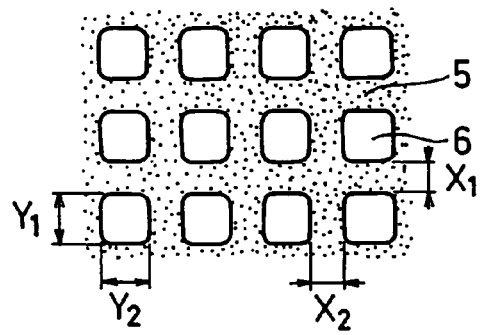
FIG. 4 is a schematic view of a lattice-like pattern used in the formation of the porous insulating layers.
Figure 5:
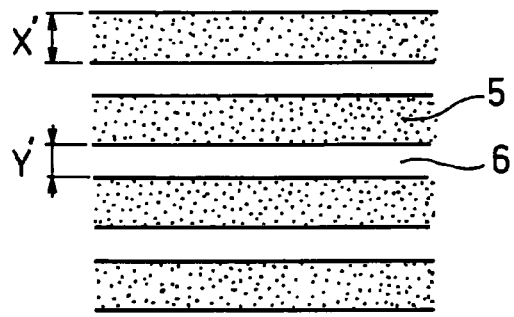
FIG. 5 is a schematic view of a belt-like pattern used in the formation of the porous insulating layers.

The first and second regions 5 and 6 can be formed by various types of patterns. For example, the first regions 5 can be island-shaped as shown in FIG. 3, or can be lattice-shaped as shown in FIG. 4. Each two of the belt-shaped first regions 5 may sandwich each one of the belt-shaped second regions 6 as shown in FIG. 5. In FIGS. 3 to 5, the first regions 5 and the second regions 6 are interchangeable with each other.

In the pattern where the belt-shaped first regions 5 and belt-shaped second regions 6 are alternately placed as shown in FIG. 5, the first and second regions 5 and 6 are not necessarily linear and can be curved or zigzag.

Figure 6:
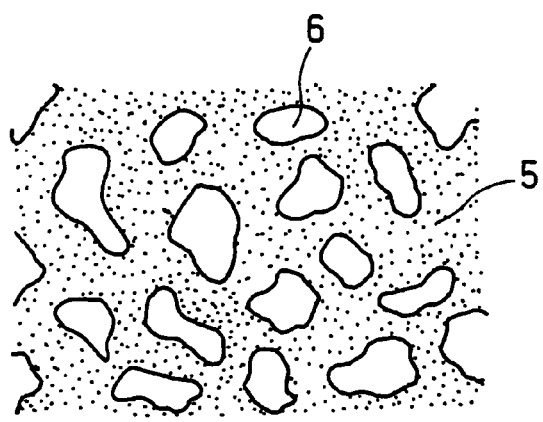
FIG. 6 is a schematic view of an irregular island-like pattern used in the formation of the porous insulating layers.

In the island-like pattern shown in FIG. 3, the first regions 5 or the second regions 6 can take any form. Furthermore, as shown in FIG. 6, the second regions 6 taking various forms can be inside the first region 5. In the patterns shown in FIGS. 3 and 6, the first regions 5 or the second regions 6 are preferably distributed uniformly.

In order to prevent the short circuit from expanding between the positive and negative electrodes, the first regions 5 preferably have a minimum width of 2 μm, and more preferably of not less than 10 μm. The second regions 6 preferably have a maximum width of not more than 500 μm, and more preferably of not more than 100 μm.

The first regions preferably have a maximum width of not more than 500 μm, and more preferably of not more than 100 μm. The second regions preferably have a minimum width of not less than 1 μm, and more preferably of not less than 10 μm. With these widths, an increase in internal resistance due to a decrease in ion conductivity can be reduced.

In the case of the lattice-like pattern shown in FIG. 4, $Y_1$ and $Y_2$ indicating the widths of the second regions 6 are preferably within the aforementioned ranges.

In the case of the belt-shaped pattern shown in FIG. 5, the first regions 5 preferably have a width X' of from not less than 2 μm to not more than 500 μm, and the second regions 6 preferably have a width Y' of from not less than 1 μm to not more than 500 μm.

In the case of the pattern as shown in FIG. 6 in which the second regions 6 are dotted in the first region 5, the second regions preferably have a maximum width of from not less than 1 μm to not more than 500 μm. A width larger than 500 μm causes excessive short circuit current to flow through the second regions so as to lead to abnormal heat generation, thus making the battery unsafe.

In times of normal use, in order to maintain the equilibrium between the absorption and desorption of lithium ions on the electrode surface, the pattern formed by the first regions and the second regions is preferably microfine.

The first regions having the porous insulating layer formed thereon preferably account for 20 to 90% of the surface of the active material layer, and more preferably 36 to 84%. Setting the percentage of the first regions to the surface area of the active material layer to 20 to 90% can achieve high ion conductivity and safety at the same time. The term "the percentage of the first regions to the surface of the active material layer" indicates the percentage of the area (apparent area) of the first regions to the surface area of the active material layer.

When the percentage of the first regions to the surface area of the active material layer is less than 20%, it may be difficult to secure safety due to the difficulty in securing insulation. When the percentage is higher than 90%, ion conductivity decreases, thereby increasing the possibility of decreasing the charge-discharge characteristics of the battery.

The use of the aforementioned patterns enables the stable and uniform formation of the regions having the porous insulating layer thereon and the regions not having the porous insulating layer thereon. The use of the aforementioned patterns also facilitates setting the proportion of the porous insulating layer to the surface area of the active material layer to 20 to 90%.

As described above, the absence of the porous insulating layer in some regions on the active material layer can achieve higher ion conductivity. Furthermore, the porous insulating layer in the other regions on the active material layer can isolate between the positive and negative electrodes, or, if a short circuit occurs, can reduce short circuit current, thereby improving the battery safety.

In other words, the provision of the first regions 5 and the second regions 6 on the surface of the active material layer can achieve both the insulation between the positive and negative electrodes and excellent ion conductivity at the same time.

Materials having heat resistance and being electrochemically stable in a lithium ion secondary battery are preferably used as the inorganic filler. Examples of such material include oxides such as alumina, silica and titanium oxide, silicon nitride, silicon carbide and calcium carbonate. These materials can be used alone, in a mixture of two or more, or as a multilayer.

The inorganic filler preferably has a particle diameter of 0.1 to 2 µm. Larger or smaller particle diameters than this range cause the inorganic filler to form inappropriate cavities (bore diameter and effective length) in the porous insulating layer, thereby reducing the ion permeability of the porous insulating layer.

Materials having heat resistance and electrolyte resistance are preferably used as the resin binder. The resin binder particularly preferably has heat resistance and rubber elasticity. One such resin binder is a rubber-like polymer containing an acrylonitrile unit.

A porous insulating layer containing such material as the binder has the advantage of being produced at a high yield because no cracks or peeling occur when an electrode assembly is formed by winding positive and negative electrodes via a separator.

From the viewpoint of exerting the aforementioned effects of the porous insulating layer and maintaining the designed capacity of the battery, the sum of the thickness of the porous insulating layer and the thickness of the separator is preferably about the same as the thickness (15 to 30 µm) of the separator used in the conventional lithium ion secondary batteries. The preferable thickness of the porous insulating layer is 0.5 to 20 µm. When the porous insulating layer is smaller than 0.5 µm in thickness, the battery safety may be decreased. When the porous insulating layer is larger than 20 µm in thickness, its ion permeability may be reduced.

The present invention uses an electrode plate provided with the aforementioned porous insulating layer as an electrode for the lithium ion secondary battery. The presence of the porous insulating layer on an active material layer can improve the safety against internal short circuit or nail penetration.

In the case that the porous insulating layer is absent on the active material layer, if a foreign matter perforates through the separator so as to short circuit between the positive and negative electrodes, an excessive amount of current flows to the short-circuit point, thereby probably generating Joule heat. In that case, the heat causes the separator to melt or shrink in the vicinity of the short-circuit point to expand the hole so as to expand the short-circuit area, thus further generating Joule heat. This repeated alternation between the expansion of the short-circuit area and the generation of Joule heat may keep raising the battery temperature, and this temperature rise may cause external deformation of the battery.

On the other hand, in a battery using the electrode of the present invention, in the case where the separator is perforated to short circuit between the positive and negative electrodes, even if the separator melts or shrinks to expand the perforated hole, the porous insulating layer distributed throughout the surface of the active material layer prevents the expansion of the short-circuit area between the positive electrode and the negative electrode. Consequently, Joule heat does not lead to abnormal heat generation. Even though the presence of the second regions cannot cut the short circuit current completely, the short circuit current can be reduced so that the generation of Joule heat is reduced to prevent a temperature rise of the battery.

Moreover, the temperature in the vicinity of the short circuit point momentarily reaches as high as 500° C., so that when the positive electrode current collector made of aluminum is used, the positive electrode current collector melts to eliminate the short circuit between the positive and negative electrodes.

In the electrode of the present invention, ions are conducted not only through the pores of the porous insulating layer but also through the second regions not having the porous insulating layer thereon. This can provide the electrode plate with extremely high ion conductivity as a whole. In other words, the battery can have a reduced internal resistance, thereby having a high capacity and excellent charge-discharge characteristics.

A method of forming the porous insulating layer onto the surface of the active material layer will be described as follows.

First, an inorganic filler, a resin binder and a solvent or a dispersion medium are mixed to form a slurry (step 1). The obtained slurry is applied on the surface of at least one of the positive electrode active material layer and the negative electrode active material layer either in an island-like pattern or in a predetermined pattern (step 2). After the application, the slurry is dried to form a porous insulating layer. As a result, the surface of the active material layer has the first regions provided with the porous insulating layer and the second regions not provided with the porous insulating layer either in the island-like pattern or in the predetermined pattern. The aforementioned solvent or dispersion medium can be one in which the inorganic filler and the resin binder can be dissolved or dispersed.

In the step (2), the application of the slurry onto the surface of the active material layer can be done by continuous coating such as gravure coating, die coating or offset printing, or drawing with inkjet nozzles, spray coating or the like.

When gravure coating is used, for example, a desired pattern as shown in FIGS. 3 to 6 can be marked on the surface of the gravure roll that holds the slurry, so that the first regions having the porous insulating layer thereon and the second regions not having the porous insulating layer thereon can be formed in a desired pattern on the surface of the active material layer.

When offset printing is used, the slurry is transferred from a roller to a transfer body, and from the transfer body onto the active material layer. This case also allows a predetermined pattern to be formed on the roller, so that the first regions having the porous insulating layer thereon and the second regions not having the porous insulating layer thereon can be formed in a desired pattern.

In the drawing with inkjet nozzles, the nozzles are arranged at predetermined intervals to jet the slurry therefrom onto the surface (of the active material layer), while the negative or positive electrode is being moved. As a result, the porous insulating layer is formed in the pattern as shown in FIG. 5. The nozzles can be also moved to form the porous insulating layer in a curved or zigzag pattern.

Jetting the slurry intermittently can form the porous insulating layer in the pattern shown in FIG. 3 where the first regions are dotted in the second region.

In the formation of the porous insulating layer, it is not necessary to perform the aforementioned pattern application. Alternatively, a slurry comprising an inorganic filler and a resin binder can be applied on the surface of the active material layer, and the slurry applied onto the surface can be leveled to have some regions where the slurry is present and the other regions where the slurry is absent. Thus, a porous insulating layer can be formed on a part of the surface of the active material layer.

Figure 7:
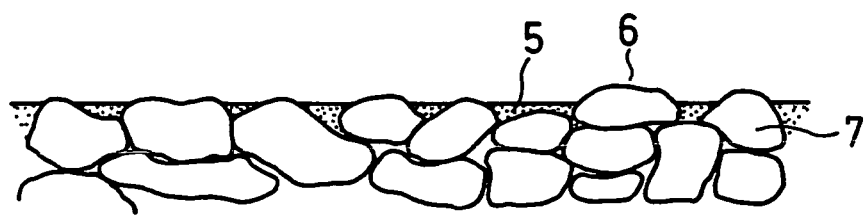
FIG. 7 is a schematic cross sectional view of the vicinity of the plate surface on which a porous insulating layer is formed.

As shown in FIG. 7, the active material layer comprising active material particles 7 has a rough surface. Therefore, by thinly applying the slurry comprising an inorganic filler, a resin binder and a solvent onto the surface of the active material layer and leaving it for a while, the slurry applied onto the surface can be leveled to have the porous insulating layer not on the protrusions but in the depressions on the surface.

This can provide the surface of the active material layer with first regions having the porous insulating layer thereon and second regions not having the porous insulating layer thereon. The first or second regions thus obtained are as small as about 1 to 50 μm, which is a favorable size.

In this case, the application of the slurry onto the surface of the active material layer can be done by the conventionally known methods. Among them, spray coating is preferable since the slurry is easy to be applied.

The leveling can be complete by leaving the slurry for 10 to 30 minutes. Even if the leveling is incomplete, it is all right if there is a region not having the slurry thereon.

The use of the aforementioned forming methods allows the first regions having the microfine porous insulating layer thereon and the second regions to be formed easily and accurately. The use of the aforementioned forming methods also facilitates setting the proportion of the first regions to the surface area of the active material layer to 20 to 90%.

The following is a description about the positive electrode, the negative electrode, the separator and the electrolyte used in the lithium ion secondary battery of the present invention.

As described above, the positive electrode comprises a positive electrode current collector and a positive electrode active material layer carried on the positive electrode current collector. The positive electrode active material layer comprises a positive electrode active material, a binder, a conductive agent and the like.

As the positive electrode active material, the active material used in the conventional lithium ion secondary batteries can be used. Examples of the positive electrode active material include lithium composite oxides, such as lithium cobalt oxide and its modified forms (including eutectics with aluminum or magnesium); lithium nickel oxide and its modified forms (including a modified form in which a part of the nickel is replaced by cobalt); and lithium manganese oxide and its modified forms. The positive electrode active material preferably has a particle diameter of about 5 to 30 μm.

As the binder, one used in the conventional lithium ion secondary batteries can be used. Examples of the binder include: polytetrafluoroethylene (PTFE); a combination of modified acrylonitrile rubber particle binder with a material having the effect of increasing viscosity such as carboxymethylcellulose (CMC), polyethylene oxide (PEO) or soluble modified acrylonitrile rubber; and polyvinylidene fluoride (PVDF) and its modified forms.

As the conductive agent, one used in the conventional lithium ion secondary batteries can be used. Examples of the conductive agent include acetylene black, ketjen black and various kinds of graphite.

As the positive electrode current collector, one used in the conventional lithium ion secondary batteries can be used. One examples of the positive electrode current collector is aluminum.

The positive electrode can be prepared as follows.

First, the positive electrode active material, the binder and the conductive agent, which are mentioned above are mixed with a solvent such as N-methylpyrrolidone (NMP) to prepare a positive electrode mixture paste. The paste is applied on the current collector, dried and rolled to produce a positive electrode provided with the active material layers. The positive electrode active material layer thus obtained has a surface with projections and depressions as shown in FIG. 7. The sizes of the projections and depressions relate to the size of the active material particles.

Similar to the positive electrode, the negative electrode comprises a negative electrode current collector and a negative electrode active material layer carried on the negative electrode current collector. The negative electrode active material layer comprises a negative electrode active material, a binder and the like.

As the negative electrode active material, the active material used in the conventional lithium ion secondary batteries can be used. Examples of the negative electrode active material include: various kinds of natural and artificial graphite; silicon-based composite materials such as silicide; and various kinds of alloy compositions. The negative electrode active material preferably has a particle diameter of about 2 to 15 μm in general.

Similar to the case of the positive electrode, the binder such as PVDF and its modified forms can be used.

The negative electrode can be prepared in the same manner as the positive electrode. The negative electrode active material layer also has a surface with projections and depressions as shown in FIG. 7.

As the separator, one comprising a microporous film can be used. The microporous film preferably comprises a material stable in the lithium ion secondary battery in times of normal use. Examples of the material include olefin-based resins such as polyethylene (PE) and polypropylene (PP). These olefin-based resins can be used alone or in combination of two or more.

The separator is preferably a polyolefin-based microporous film. In the separator made of such polyolefin-based microporous film, the pores are closed (what is called "shutdown") at high temperatures, so that this separator can be used together with the aforementioned porous insulating layer to further improve the battery safety.

The separator is preferably 10 to 25 μm in thickness.

If necessary, an inexpensive separator such as unwoven cloth may be used. To further improve the safety, the separator can be made heat resistant by using aramid resin.

As the electrolyte, one used in the conventional lithium ion secondary batteries can be used. One example of the electrolyte is one comprising a nonaqueous solvent and lithium salt dissolved therein.

The various kinds of lithium compounds such as $LiPF_6$ and $LiBF_4$ can be used as the lithium salt.

Examples of the nonaqueous solvent include: ethylene carbonate (EC); dimethyl carbonate (DMC); diethyl carbonate (DEC); and ethyl methyl carbonate (EMC). These solvents can be used alone or in combination of two or more.

In order to form an excellent film onto the positive and/or negative electrodes so as to improve the stability during overcharge, vinylene carbonate (VC), cyclohexylbenzene (CHB) or the like may be added to the nonaqueous solvent.

EMBODIMENTS

The present invention will be described more specifically as follows, based on examples.

Example 1

Preparation of the Positive Electrode

A positive electrode mixture paste was produced by mixing 3 kg of lithium cobalt oxide having a mean particle diameter of 3 μm; 1 kg of N-methylpyrrolidone solution (solid content: 12 wt %) of polyvinylidene fluoride (#1320 manufactured by Kureha Chemical Industry Co., Ltd.); 90 g of acetylene black; and an appropriate amount of NMP in a double-arm kneader. The paste thus produced was applied on both sides of a 15 μm-thick aluminum foil which was the positive electrode current collector and dried to obtain a positive electrode plate. Next, the positive electrode plate was rolled so that it was 160 μm thick. Then, the rolled positive electrode plate was cut so that it could be inserted into a cylindrical case of size 18650, thereby obtaining a positive electrode.

(Preparation of the Negative Electrode)

A negative electrode mixture paste was produced by mixing 3 kg of artificial graphite having a mean particle diameter of 20 μm; 75 g of a styrene-butadiene copolymer rubber particle binder (BM-400B (solid content: 40 wt %) manufactured by Zeon Corporation); 30 g of carboxymethylcellulose (CMC); and an appropriate amount of water in a double-arm kneader. The paste thus produced was applied on both sides of a 10 μm-thick copper foil which was the negative electrode current collector and dried to obtain a negative electrode plate. Next, the negative electrode plate was rolled so that it was 180 μm thick. Then, the rolled negative electrode plate was cut so that it could be inserted into a cylindrical case of size 18650, thereby obtaining a negative electrode.

(Preparation of the Porous Insulating Layer)

A slurry for forming a porous insulating layer containing an inorganic filler and a resin binder was produced by mixing 950 g of alumina having a median diameter of 0.3 μm; 625 g of a polyacrylonitrile modified rubber binder (BM-720H (solid content: 8 wt %) manufactured by Zeon Corporation); and an appropriate amount of NMP in a double-arm kneader.

Figure 8:
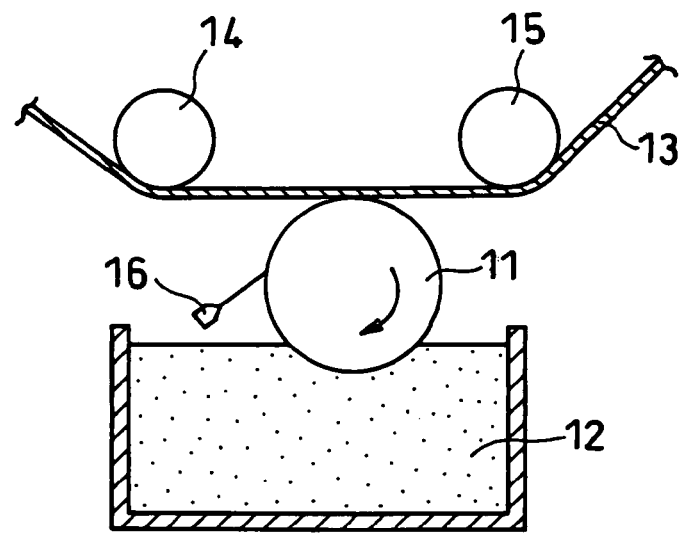
FIG. 8 is a schematic vertical cross sectional view of a gravure coater.

With the gravure coater shown in FIG. 8, the obtained slurry was applied in the lattice-like pattern shown in FIG. 4 onto the surface of the negative electrode active material layer formed on one side of the negative electrode and dried to form a porous insulating layer. The same operation was done onto the surface of the other negative electrode active material layer formed on the other side of the negative electrode so as to form the porous insulating layers on both sides of the negative electrode.

In the gravure coater shown in FIG. 8, a gravure roll 11 is provided on its surface with a lattice-like pattern. The bottom of the gravure roll 11 is in contact with the slurry for forming the porous insulating layer. Rotating the gravure roll 11 in the direction of the arrow allows a porous insulating layer to be formed in a lattice-like pattern on the surface of a negative electrode active material layer of the negative electrode 13. Rolls 14 and 15 have the function of moving the negative electrode 13. Extra slurry on the surface of the gravure roll 11 is removed by a doctor 16.

In the lattice-like pattern, the widths $X_1$ and $X_2$ were set to 200 μm, and the widths $Y_1$ and $Y_2$ were set to 300 μm. The regions having the porous insulating layers thereon accounted for 64% of the surfaces of both of the negative electrode active material layers. The porous insulating layers were 6 μm in thickness.

The percentage of the porous insulating layers to the surfaces of the active material layers was found by scanning a certain range of the surface of the electrode having the porous insulating layer thereon into a PC as image, and then image-processing the image by the pixel method.

(Preparation of the Battery)

The positive and negative electrodes thus obtained were wound via a 20 μm-thick polyethylene microporous film, which was the separator, and cut into a predetermined length to obtain an electrode assembly. The obtained electrode assembly was inserted into a cylindrical battery case, which was filled with 5.5 g of electrolyte and sealed to form a cylindrical lithium ion secondary battery having a designed capacity of 2000 mAh and the size 18650.

The electrolyte was prepared by dissolving $LiPF_6$ and adding vinylene carbonate (VC) in a mixture solvent (EC:DMC:EMC=2:2:5 (weight ratio)) consisting of ethylene carbonate (EC), dimethyl carbonate (DMC) and ethyl methyl carbonate (EMC). The concentration of $LiPF_6$ was 1M and the ratio of vinylene carbonate was 3 wt % of the electrolyte.

The lithium ion secondary battery thus obtained was referred to as battery 1.

Example 2

A lithium ion secondary battery was prepared in the same manner as in Example 1 except that when porous insulating layers with the lattice-like pattern were formed on the surfaces of negative electrode active material layers, the widths $X_1$ and $X_2$ were set to 100 μm, and the widths $Y_1$ and $Y_2$ were set to 400 μm in the lattice-like pattern. The obtained battery was referred to as battery 2. The regions having the porous insulating layers thereon accounted for 36% of the surfaces of both of the negative electrode active material layers.

Example 3

A lithium ion secondary battery was prepared in the same manner as in Example 1 except that when porous insulating layers with the lattice-like pattern were formed on the surfaces of negative electrode active material layers, the widths $X_1$ and $X_2$ were set to 300 μm, and the widths $Y_1$ and $Y_2$ were set to 200 μm in the lattice-like pattern. The obtained battery was referred to as battery 3. The regions having the porous insulating layers thereon accounted for 84% of the surfaces of both of the negative electrode active material layers.

Example 4

A slurry for forming a porous insulating layer was prepared in the same manner as in Example 1. The slurry was then thinly applied on a negative electrode active material layer with a die coater. The negative electrode applied with the slurry was left for 30 minutes, and the film was leveled. The film was dried to form a porous insulating layer in the depressions of the negative electrode active material layer. The same operation was done onto the surface of the other negative electrode active material layer formed on the other side of the negative electrode so as to form the porous insulating layers on both sides of the negative electrode. The porous insulating layers were 3 μm in thickness. The first regions having the porous insulating layers thereon accounted for 60% of the surfaces of the negative electrode active material layers.

With the negative electrode provided with the porous insulating layers on its surfaces thus obtained, a lithium ion secondary battery was produced in the same manner as in Example 1. The obtained battery was referred to as battery4.

Example 5

A slurry for forming a porous insulating layer was prepared in the same manner as in Example 1. The prepared slurry was then applied, in the belt-like pattern shown in FIG. 5, onto each of the negative electrode active material layers by inkjet printing.

While the negative electrode was moved at a speed of 1.4 m/min., the slurry was jet at a speed of 60 times/sec onto the negative electrode from nozzles provided with inkjet heads arranged at the intervals of 800 μm. Since the moving speed of the negative electrode was low enough compared to the jetting frequency, the jetted slurry was drawn in the shape of continuous belts on the negative electrode. The first regions had a width X' of 500 μm, and the second regions had a width Y' of 300 μm.

Thus, the porous insulating layers are formed on both sides of the negative electrode.

The regions having the porous insulating layers accounted for 63% of the surfaces of both of the active material layers. The porous insulating layers were 4 μm in thickness.

The applied slurry was then dried to form the porous insulating layers.

With the negative electrode having the porous insulating layers on its surfaces thus obtained, a lithium ion secondary battery was produced in the same manner as in Example 1. The obtained battery was referred to as battery 5.

Example 6

A lithium ion secondary battery was prepared in the same manner as in Example 5 except that the moving speed of the negative electrode onto which the slurry was jetted was changed to 2 m/sec.

In the present example, the moving speed of the negative electrode was high enough compared to the frequency of jetting the slurry, so that the porous insulating layers were formed discontinuously like islands shown in FIG. 3 on the negative electrode active material layers. One island-shaped piece of porous insulating layer had a maximum width of about 500 μm, and the first regions having the porous insulating layers thereon accounted for 40% of the surfaces of both of the negative electrode active material layers. The porous insulating layers were 4 μm in thickness.

Example 7

A slurry for forming a porous insulating layer was prepared in the same manner as in Example 1. The prepared slurry was then thinly applied on a negative electrode active material layer by spray coating. The negative electrode applied with the slurry was left for 10 minutes, and the coating film was leveled. The coating film was dried to form a porous insulating layer in the depressions of the negative electrode active material layer. The same operation was done onto the surface of the other negative electrode active material layer formed on the other side of the negative electrode so as to form the porous insulating layers on both sides of the negative electrode. The porous insulating layers were 2 μm in thickness. The first regions accounted for 55% of the surfaces of both of the negative electrode active material layers.

With the negative electrode having the porous insulating layers on its surfaces thus obtained, a lithium ion secondary battery was produced in the same manner as in Example 1. The obtained battery was referred to as battery 7.

Example 8

A lithium ion secondary battery was prepared in the same manner as in Example 1 except that when the porous insulating layers with the lattice-like pattern were formed on the surfaces of negative electrode active material layers, the widths $X_1$ and $X_2$ were set to 50 μm, and the widths $Y_1$ and $Y_2$ were set to 450 μm in the lattice-like pattern. The obtained battery was referred to as battery 8. The first regions having the porous insulating layers thereon accounted for 19% of the surfaces of both of the negative electrode active material layers.

Example 9

A lithium ion secondary battery was prepared in the same manner as in Example 1 except that when porous insulating layers with the lattice-like pattern were formed on the surfaces of negative electrode active material layers, the widths $X_1$ and $X_2$ were set to 350 μm, and the widths $Y_1$ and $Y_2$ were set to 150 μm in the lattice-like pattern. The obtained battery was referred to as battery 9. The first regions having the porous insulating layers thereon accounted for 91% of the surfaces of both of the negative electrode active material layers.

Comparative Example 1

A lithium ion secondary battery was prepared in the same manner as in Example 1 except that no porous insulating layers were formed on the negative electrode active material layers. The obtained battery was referred to as comparative battery 1.

Table 1 shows the formation patterns of the porous insulating layers, the percentage of the first regions to the surfaces of the active material layers, the thickness of the porous insulating layers, and the method for applying the slurry onto the active material surfaces of batteries 1-9 and comparative battery 1.

TABLE 1

| | porous insulating layer | | | |
|---|---|---|---|---|
| | formation pattern | the percentage of the first regions to the surfaces of the active material layers (%) | thickness (Mm) | application method |
| battery 1 | lattice-shaped | 64 | 6 | gravure coating |
| battery 2 | lattice-shaped | 36 | 6 | gravure coating |
| battery 3 | lattice-shaped | 84 | 6 | gravure coating |
| battery 4 | island-shaped | 60 | 3 | die coating |
| battery 5 | belt-shaped | 63 | 5 | inkjet printing |
| battery 6 | island-shaped | 40 | 5 | inkjet printing |
| battery 7 | island-shaped | 55 | 3 | spray coating |
| battery 8 | lattice-shaped | 19 | 6 | gravure coating |
| battery 9 | lattice-shaped | 91 | 6 | gravure coating |
| comparative battery 1 | none | — | — | — |

These batteries were evaluated as follows.

(Charge-discharge Characteristics)

Batteries 1 to 9 and comparative battery 1 were subjected to two times of preconditioning charge-discharge operation and left for seven days at a 45° C. environment. Later, these batteries were subjected to the following two different charge-discharge tests at a 20° C. environment.

(1) First, a constant current charging was carried out at a charging current of 1400 mA until the charging voltage reached 4.2V, and then a constant voltage charging was carried out until the charging current reached 100 mA while the voltage was kept at 4.2V. After this, a constant current discharging was carried out with a discharging current of 400 mA and a discharge final voltage of 3V. The discharge capacity at this discharging was found.

(2) First, a constant current charging was carried out at a charging current of 1400 mA until the charging voltage reached 4.2V, and then a constant voltage charging was carried out until the charging current reached 100 mA while the voltage was kept at 4.2V. After this, a constant current discharging was carried out with a discharging current of 4000 mA and a discharge final voltage of 3V. The discharge capacity at this discharging was found.

The obtained results are shown in Table 2.

(Safety Against Nail Penetration)

After the batteries were evaluated for their charge-discharge characteristics, a constant current charging was carried out at a charging current of 1400 mA at a 20° C. environment until the charging voltage reached 4.25V. Then, a constant voltage charging was carried out until the charging current reached 100 mA while the voltage was kept at 4.25V. An iron wire nail with a diameter of 2.7 mm was made to penetrate through each of the charged batteries at a speed of 5 mm/sec at a 20° C. environment. The temperature reached after 1 second and the temperature reached after 90 seconds in the vicinity of the penetrated position were measured. The obtained results are shown in Table 2.

TABLE 2

| | charge-discharge characteristics | | safety against nail penetration | |
|---|---|---|---|---|
| | (1) discharge capacity after a discharging at 400 mA (mAh) | (2) discharge capacity after a discharging at 4000 mA (mAh) | temperature reached 1 second later (° C.) | temperature reached 90 second later (° C.) |
| battery 1 | 1977 | 1854 | 64 | 99 |
| battery 2 | 2001 | 1874 | 71 | 108 |
| battery 3 | 1950 | 1839 | 66 | 97 |
| battery 4 | 1974 | 1850 | 67 | 101 |
| battery 5 | 1970 | 1845 | 67 | 102 |
| battery 6 | 1971 | 1847 | 69 | 105 |
| battery 7 | 1969 | 1849 | 72 | 102 |
| battery 8 | 1985 | 1877 | 110 | 135 |
| battery 9 | 1941 | 1562 | 65 | 90 |
| comparative battery 1 | 2005 | 1898 | 151 | immeasurable |

Table 2 shows that the overheat caused by the nail penetration is greatly reduced in the batteries 1 to 7. These batteries 1 to 7 were decomposed after the test to find that the porous insulating layers were present on the active material layers as they were before the test in each of the batteries 1 to 7. Furthermore, the separator melted only a little. These indicate that the porous insulating layer is not shrunk by the heat from short circuit caused by the nail penetration, and can prevent the expansion of the short-circuit area so as to prevent a large overheat.

On the other hand, comparative battery 1, which has no porous insulating layers on the negative electrode active material layers, caused significant overheat in the nail penetration test.

Unlike batteries 1 to 7, battery 8 had a temperature rise 90 seconds after the penetration of the nail. The reason for this seems to be that the percentage of the porous insulating layers to the surfaces of the negative electrode active material layers is 19% and is too small to fully prevent the short circuit current. Battery 8 may not be sufficiently safe.

Battery 9 exhibited sufficient safety features in the nail penetration test. However, the discharge capacity after the discharging at 4000 mA was somewhat low. The reason for this seems to be that the percentage of the porous insulating layers to the surfaces of the negative electrode active material layers was as high as 91%, so that the ion conductivity was decreased.

INDUSTRIAL APPLICABILITY

The lithium ion secondary battery of the present invention is useful as a power source for portable devices requiring high safety standards.

The invention claimed is:

1. An electrode plate for a lithium ion secondary battery, being used as a positive electrode plate or a negative electrode plate, comprising:
    an active material layer containing particles of active material, wherein the active material layer has a surface; and
    a porous insulating layer comprising an inorganic oxide filler and a resin binder formed on the surface of said active material layer, wherein the surface of the active material layer includes first regions where said insulating layer is formed and second regions where said insulating layer is not formed, wherein each first region has a width measured between adjacent second regions of from not less than 2 μm to not more than 500 μm and each second region has a width measured between adjacent first regions of from not less than 1 μm to not more than 500 μm, and the second regions are dotted in the first regions.

2. The electrode plate for a lithium ion secondary battery of claim 1, wherein the first regions cover between 20% to 90% of the surface of the active material layer.

3. The electrode plate for a lithium ion secondary battery of claim 2, wherein the first regions cover between 36% to 84% of the surface of the active material layer.

4. The electrode plate for a lithium ion secondary battery of claim 1, wherein the second regions are completely surrounded by the first regions as seen in plan view.

5. The electrode plate for a lithium ion secondary battery of claim 1,
    wherein the first regions are formed in depressions in the surface of the active material layer.

6. The electrode plate for a lithium ion secondary battery of claim 1, wherein the second regions comprise protrusions on the surface of the active material layer.

7. The electrode plate for a lithium ion secondary battery of claim 6, wherein the protrusions comprise active material particles.

8. The electrode plate for a lithium ion secondary battery of claim 1, wherein each first region has a width measured between adjacent second regions of from not less than 10 μm to not more than 100 μm and each second region has a width measured between adjacent first regions of from not less than 10 μm to not more than 100 μm.

9. A lithium ion secondary battery comprising:
    a positive electrode plate including a positive electrode active material layer containing particles of a lithium composite oxide;
    a negative electrode plate including a negative electrode active material layer containing particles of negative electrode active material;
    a separator disposed between said positive electrode plate and said negative electrode plate; and
    an electrolyte solution containing a nonaqueous solvent,
    wherein either the positive electrode plate or the negative electrode plate being the electrode for the lithium ion secondary battery according to claim 1.

* * * * *